Nov. 3, 1970 D. T. WILSON ET AL 3,537,171

METHOD OF MOLDING VERTICAL BOSSES

Filed July 15, 1968 3 Sheets-Sheet 1

INVENTORS
DELBERT T. WILSON
RICHARD J. YOUNG

BY E. Ronald Coffman
ATTORNEY.

Nov. 3, 1970    D. T. WILSON ET AL    3,537,171
METHOD OF MOLDING VERTICAL BOSSES

Filed July 15, 1968    3 Sheets-Sheet 3

United States Patent Office 3,537,171
Patented Nov. 3, 1970

3,537,171
METHOD OF MOLDING VERTICAL BOSSES
Delbert T. Wilson, Austin, Tex., and Richard J. Young, Lexington, Ky., assignors to International Business Machines Corporation, Armonk, N.Y., a corporation of New York
Filed July 15, 1968, Ser. No. 744,843
Int. Cl. B23k 21/00
U.S. Cl. 29—470.1                           10 Claims

ABSTRACT OF THE DISCLOSURE

Mounting bosses and other solid forms are simultaneously molded and pressure welded to preformed sheet material by use of highly formable superplastic metals characterized by their abnormally low flow stress.

DISCLOSURE OF THE INVENTION

Sheet metal shapes such as the decorative covers of business machines can be formed from sheet stock by the use of brakes or drawing techniques, or can be vacuum or pressure formed by superplastic sheet metal as described in U.S. Pat. 3,340,101, entitled "Thermoforming of Metals," issued Sept. 5, 1967, to Davis S. Fields, Jr., Daniel L. Mehl and Bernard F. Addis. For practical use of such covers, however, it is often necessary to attach mounting bosses, reinforcing ribs and other solid shapes to the sheet.

We have determined that superplastic materials, such as those described in the aforementioned U.S. patent, are sufficiently deformable in compression under suitably low force to enable their deforming in situ upon the wall or surface of a preformed sheet metal shape. The process of compression forming such bosses, or other parts, if accompanied by a substantial surface-to-surface sliding between material of the part being formed and the sheet preform, will produce a secure integral friction weld therebetween. Solid components are easily formed on side edges where the required sliding contact is readily achieved in the molding of the final shape. However, a secure bond can be produced in any case by providing a portion of the shape formed that extends parallel to the surface of the preform such that a significant sliding contact is produced in the formation of the added component.

The selection of materials for forming depends principally upon the relative forming and melting temperatures of the solid and sheet components, respectively. Friction welds are notably more tolerant to alloy incompatabilities than welds involving molten metal. Accordingly, the prime consideration in selecting a material for making the solid shape is its flow stress and whether its forming temperature is below the melting temperature of the sheet to which it is to be attached. Zinc-aluminum (78%–22% by weight) solid shapes have been successfully formed on sheet preforms of the same material as well as on preforms of an aluminum and copper based alloy. Furthermore, the following materials each exhibit a sufficiently low flow stress as to be appropriate materials for forming solid shapes on sheet material having a melting temperature substantially in excess of those listed:

| Alloy | Percent by weight | Forming temperature,° F. |
| --- | --- | --- |
| 78% zinc | 22% aluminum | 532 |
| 67% aluminum | 33% copper | 1,018 |
| 88.3% aluminum | 11.7% silicon | 1,071 |
| 62% copper | 38% zinc | 968 |
| 59% copper | 41% zinc | 932 |
| 52% copper | 48% zinc | 896 |

Briefly, our process involves the provision of a shaping die formed in part by a surface of a sheet preform to which a solid member is to be attached. The die defines a cavity for shaping the solid member and is adequately supported on all sides to resist the forces of compression. These forces are extremely low compared to the forces required to deform conventional materials, thus enabling the use of the preform as a portion of the die itself.

A body or slug of stock material conditioned to exhibit its low flow stress is placed within the cavity and maintained at its optimum forming temperature either by insulation or the addition of heat.

A piston or die closure member, which can be shaped to provide some of the final solid member shaping, is inserted and force is applied causing the stock material to be deformed against the sidewall. The resulting deformation combined with substantial sliding against the sidewall of the preform produces an integral friction weld.

These and other objects, features, and advantages of our invention will be apparent to those skilled in the art from the following more detailed description of some preferred embodiments of our invention wherein reference is made to the accompanying drawings of which:

Figure 1:
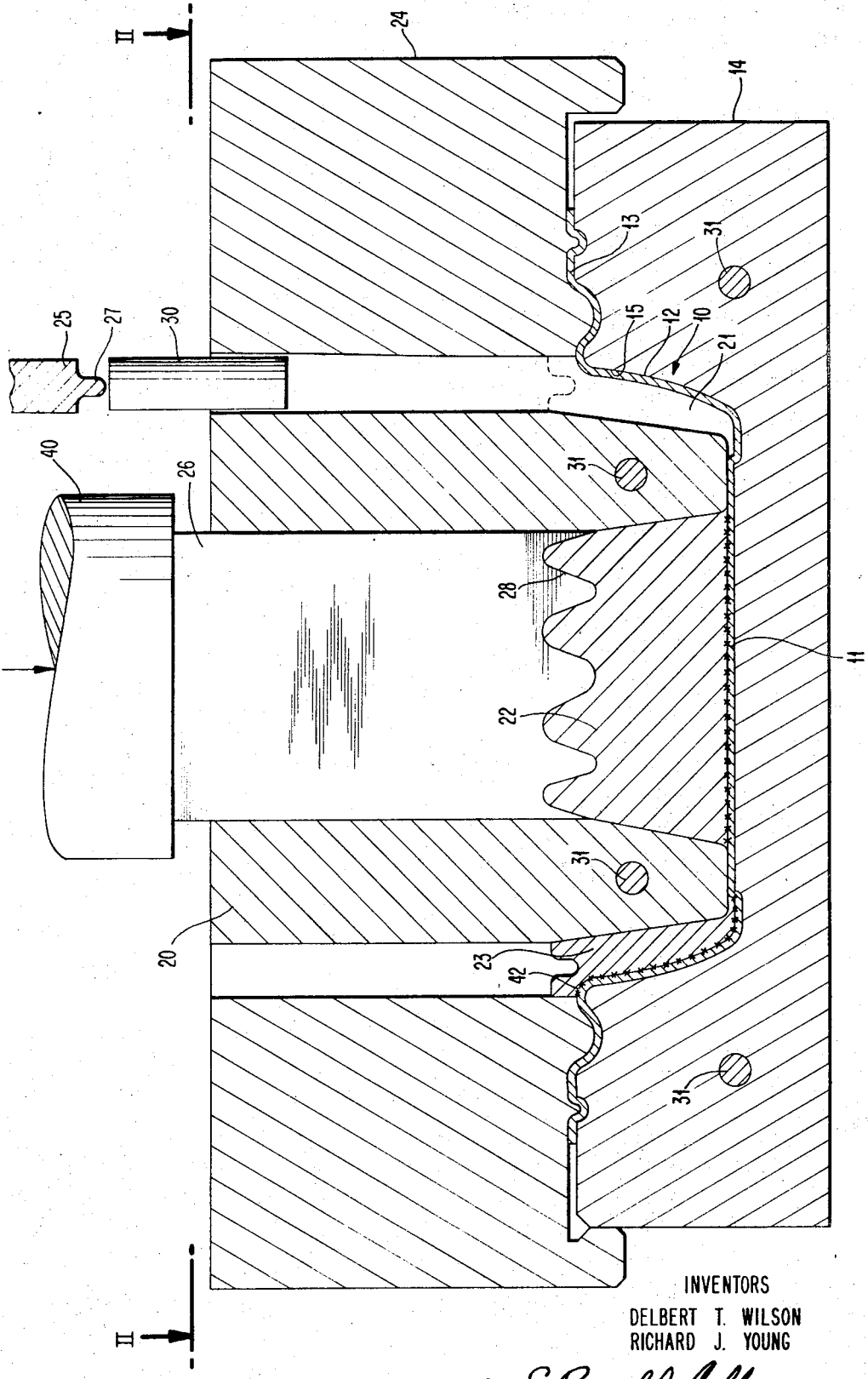
FIG. 1 is a front elevational cross-sectional view of a typical sheet metal preform in a die for molding bosses and other solid components.

Referring now more specifically to the drawings, in FIG. 1 there is shown a preformed sheet metal shape 10 of a typical flattened dome configuration having a thin or sheet-like bottom wall 11 and an upwardly-inclined, thin or sheet-like annular side wall 12. It is preferred that the preformed sheet metal shape include a flange 13 by which it can be gripped during processing. The preformed sheet 10 can be formed directly into a die or backing support block member 14 by the techniques described in the aforesaid U.S. Pat. No. 3,340,101. Alternatively, the preformed sheet metal shape 10 can be formed separately by more conventional methods such as spinning or die casting, and then be placed in the backing support block member 14. In any event, support member 14 provides a support cavity or contour 15 that closely conforms to the outer configuration of the sheet metal shape 10 at least in the region where a solid shape is to be attached.

Figure 2:
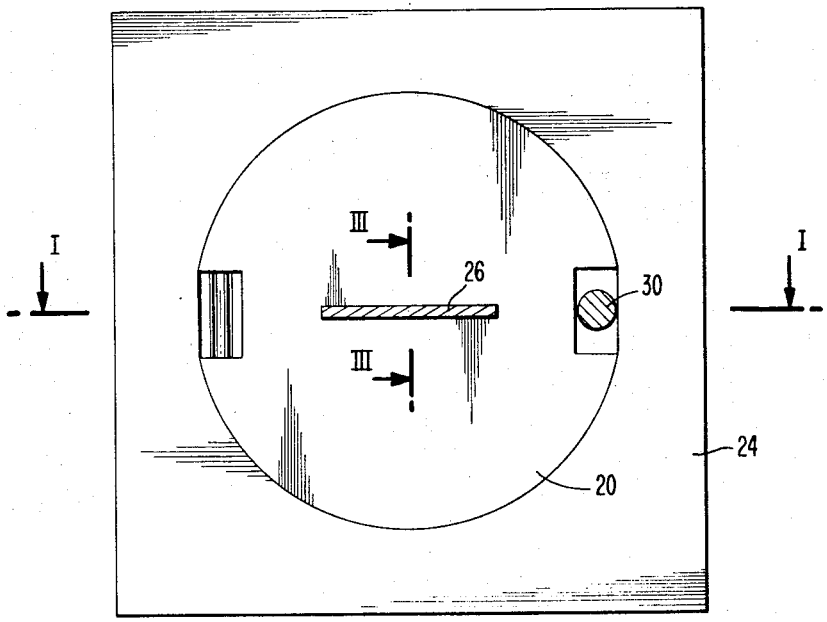
FIG. 2 is a top or plane view of the die shown in FIG. 1 taken along line II—II thereof.

As shown in FIGS. 1 and 2, a die insert 20 is positioned inside of the preform and shape 10 and combines therewith to provide three die cavities 21, 22, and 23 for forming solid shapes substantially complementary thereto. The die cavities, such as cavity 21, for example, may also be partially formed by an external shroud or block 24 which forms part of the die cavity completely exterior of the shape 10. Reciprocatable pistons or plungers 25 and 26 complete the cavities 21 and 22 by providing configured, inwardly facing surfaces 27 and 28 respectively. The piston for cavity 23 is not shown. Note that the motion of piston 25 is generally in the direction of the side wall 12 to which a friction weld is to be made. Note also that the motion of piston 26 is generally transverse to the direction of the bottom wall 11 to which a friction weld is also to be made. All cavity forming surfaces of the die parts 20, 24, 25, and 26, and the backing member 14 are treated with suitable commercially available parting lubricants as used in the die casting industry. These materials generally contain selected temperature resistant oils and may be combined with molybdenum disulfide or colloidal graphite. The insert 20, backing block 14, and external shroud 24 are held together about the preform sheet 10 by suitable clamping mechanism as in a press, not shown, to resist movement of these die parts during forming.

An unformed slug or body such as 30, shown in FIG. 1, of material selected from the group identified above, or any other equivalent metal, is placed in each of the cavities 21, 22, and 23. The slug 30 must be preconditioned to exhibit its low flow stress. For a slug of essentially 78% zinc–22% aluminum by weight, the preconditioning required is like that described in aforesaid U.S. Pat. No. 3,340,101. This preconditioning essentially comprises quenching a body of the alloy from a temperature in excess of 532° F. at a rate sufficient to significantly suppress equilibrium phase and composition transformation. At the time for forming, this slug is reheated to within the temperature range of 500 to 532° F. This latter step may occur within the die cavities through the use of electrical resistance heaters 31. Alternatively, the slug 30 may be preheated externally of the die and only sufficient heat added in the die to maintain the slug temperature during forming.

Figure 3:
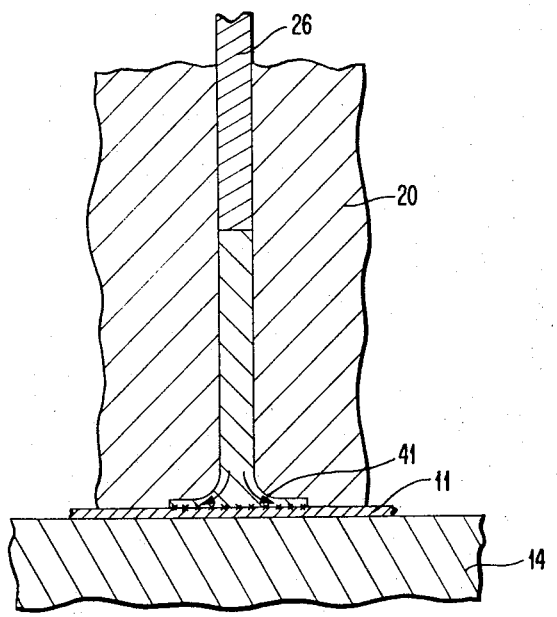
FIG. 3 is a fragmentary vertical cross-sectional view of the die shown in FIGS. 1 and 2 showing a detail of its construction and is taken along line III—III of FIG. 2.

As shown particularly in connection with cavity 22, the die is closed by the piston 26 which is driven into the slug by a ram 40. In the case of cavities 21 and 23, the slug is moved along the inner surface of side wall 12 as the slug is deformed. The deformation of the slug against the side wall causes the slug to expose new surface to the preformed sheet and friction weld thereto. In the case of cavity 22, where the piston 26 moves normal to the desired weld on bottom wall 11, it is necessary to provide the cavity 22 with an expanded base section configuration 41 as shown in FIG. 3. The slug is thus severely deformed laterally across the surface of the bottom wall 11 in a manner to create a useful friction weld therewith. The slugs are not welded against other portions of the die due to the parting lubricants described above. Note that a common characteristic of each of the die cavities 21, 22, and 23 is the slug deformation along the surface to which the slug is to be joined.

Figure 4:
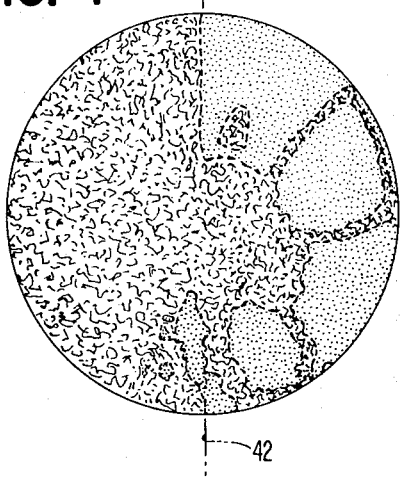
FIG. 4 is a drawing of a photomicrograph of a polished and etched section taken along the adjoining line between a sheet preform and solid component molded in accordance with our invention.

FIG. 4 shows a 500× magnification of a metallurgical section of the interface 42 between a typical compression formed shape of 78% zinc–22% aluminum and a preformed sheet of a zinc die casting alloy (analysis by weight—3.5 to 4.3% aluminum, 0 to .25% copper, .03 to .08% magnesium, balance zinc) joined by the process of our invention. The metallurgical bonding between the two parts is self-evident.

After forming a solid shape as described above from a eutectoid alloy such as the 78% zinc–22% aluminum alloy, we prefer to overheat the parts into a range of nonsuperplasticity to thereby increase their resistance to subsequent deformation. This is particularly important for shapes to be used to perform some load bearing function and to prevent deformation of complex shapes during removal from the mold.

Figure 5:
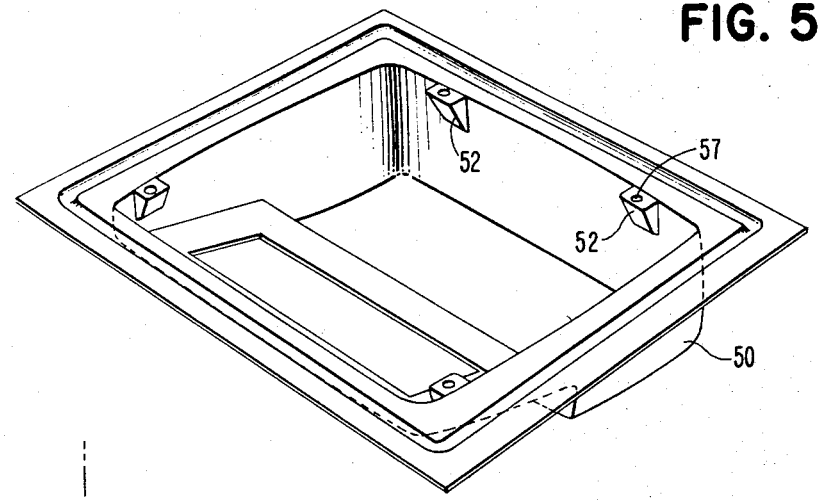
FIG. 5 is a preform for a typical machine cover having threaded mounting bosses formed by the method of this invention to show a specific application therefor.
Figure 6:
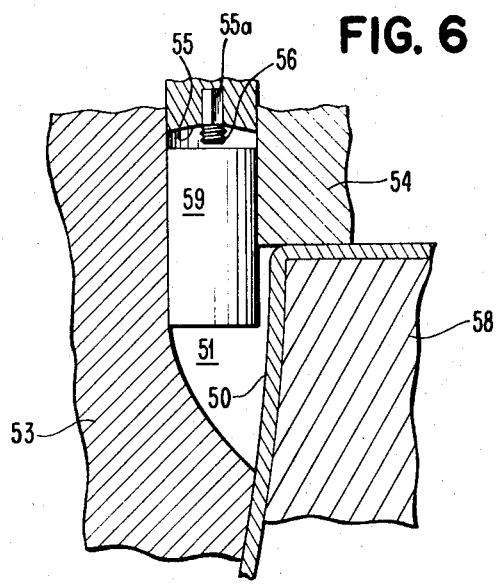
FIG. 6 shows a detailed fragmentary cross-sectional view of a die for forming the bosses shown in FIG. 5.

FIGS. 5 and 6 show a more specific application of our process wherein a sheet metal preform for a typewriter cover 50 has been thermoformed according to the process described in aforesaid U.S. Pat. 3,340,101, and has had four mounting bosses 52 formed along its side wall in accordance with our invention. FIG. 6 shows a fragmentary operational view of a die cavity 51 defined by the preformed sheet 50, a die insert 53, an outer shroud 54, and a plunger 55 defining a downwardly facing movable wall. Plunger 55 has a threaded screw 56 for molding a threaded opening 57 in the boss 52 to be formed. Backing member 58 supports the wall 50 adjacent the area to be processed. A preconditioned slug 59 of an appropriate metal, for example the 78% zinc–22% aluminum alloy, is placed in the cavity 51 and plunger 55 is driven into the slug to deform it along the inner wall of the sheet 50 and into the shape of the threaded boss 52 shown in FIG. 5. After forming, screw 56 is rotated to release it from the thus formed threaded boss.

Figure 7:
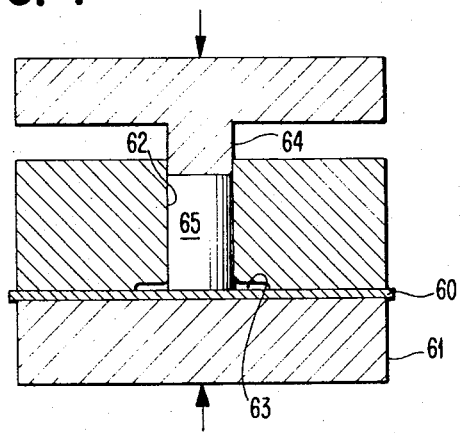
FIG. 7 is a front cross-sectional view of a test die configuration for determining the effectiveness of any pair of metal components desired to be employed in the practice of our invention.

In FIG. 7 there is shown an experimental die design by which a number of materials have been tested to show the breadth of our invention. A simple flat sheet preform 60 is selected of a base material desired to be tested and is supported on a simple flat table or backing member 61. A die having a central bore 62 and a hollowed out or flange-forming portion 63 combines with sheet 60 to define a die cavity. Force is applied through a piston 64 onto a slug 65 of a selected preconditioned stock material by a suitable press not shown. The following specific examples demonstrate the successful application of our invention to different materials. Useful weld bonding between the formed solid shape and the preformed sheet shape has been demonstrated as to each example.

| Ex. | Slug material (By weight) | Sheet material (By weight) |
|---|---|---|
| 1 | 78% zinc; 22% aluminum | 78% zinc; 22% aluminum. |
| 2 | do | 0–.25% copper; 3.5–4.3% aluminum; .03–.08% magnesium; balance, zinc. |
| 3 | do | 64–68.5% copper; .15% lead; balance, zinc. |
| 4 | do | 3.3–4.0% copper; 7.5–9.5% silicon; 0–.1% magnesium; 0–3.0% zinc; 0–.5% manganese; 0–2.0% iron; 0–.35% tin; 0–.5% nickel; balance aluminum. |
| 5 | do | .5% silicon; .5% iron; 3.8–4.9% copper; .3–.9% manganese; 1.2–1.8% magnesium; .1% chrome; 2.5% zinc; balance, aluminum. |

From the confirmation of these examples we have determined that the 78% zinc–22% aluminum will form a satisfactory bond with preformed sheets of zinc, aluminum, and copper based alloys, i.e. alloys possessing at least 50% by weight of these materials.

Those skilled in the are will recognize that we have demonstrated a particularly efficient manufacturing process capable of extending the value of sheet metal parts into the field now dominated by die casting. It will be understood that the specific parts and die configurations shown in the drawing are illustrative only and that this process is applicable to a wide variety of sheet and solid configurations.

We claim:

1. The process of forming solid shapes integrally with preformed metal shapes comprising the steps of:
   providing a preformed metal shape having at least one sheet wall portion,
   providing a backing member for supporting said preformed sheet metal shape in at least the region thereof to which it is desired to form a solid shape,
   providing means defining a die cavity configured complementary to the desired solid shape and including at least part of said wall portion of the preformed metal shape,
   providing stock metal preconditioned to exhibit a low flow stress,
   placing said stock metal in said die cavity, and
   closing said die cavity about said stock metal to cause said stock metal to deform and move along said sheet metal wall portion of said die cavity and friction weld thereto.

2. The process of forming solid metal shapes integrally with preformed metal shapes as defined in claim 1 wherein said stock metal is selected from the class consisting of by weight, essentially:

78% zinc–22% aluminum
67% aluminum–33% copper
88.3% aluminum–11.7% silicon
62% copper–38% zinc
59% copper–41% zinc
52% copper–48% zinc.

3. The process of forming solid shapes integrally with preformed metal shapes as defined in claim 1 wherein said stock metal comprises essentially 78% zinc–22% aluminum by weight, which has been preconditioned by quenching from a homogenous state at a temperature in excess of 532° F., and heated to and maintained within a temperature range of substantially 500 to 532° F., until completion of said die closing step.

4. The process of forming solid shapes integrally with preformed metal shapes as defined in claim 3 wherein said preformed metal shape comprises essentially 78% zinc–22% aluminum by weight.

5. The process of forming solid shapes integrally with preformed metal shapes as defined in claim 3 wherein said preformed metal shapes comprise alloys containing at least 50% by weight of a metal selected from the group of zinc, aluminum, and copper.

6. The process as defined in claim 1 wherein said die cavity defining means includes a rectilinearly movable wall and said wall portion of said preformed metal shape is positioned to extend generally in the direction of movement of said movable wall.

7. The process defined in claim 1 wherein said die cavity defining means includes a rectilinearly movable wall, said wall portion of said preformed sheet metal shape is positioned to extend generally transverse to the direction of movement of said movable wall, and said die cavity defining means further includes a shaping surface portion adjacent said wall portion constraining said stock metal to flow a substantial distance along said wall portion nad in contact therewith.

8. The process defined in claim 1 wherein said die cavity defining means includes cavity forming surfaces at least some of which have been treated with a low friction providing mold release agent.

9. The process as defined in claim 6 wherein said rectilinearly movable wall is configured to form a non-planar surface of said solid metal.

10. The process as defined in claim 7 wherein said rectilinearly movable wall is configured to form a non-planar surface of said solid metal shape.

References Cited

UNITED STATES PATENTS

| | | | |
|---|---|---|---|
| 2,894,323 | 7/1959 | Sowter et al. | 29—470.1 X |
| 3,049,791 | 8/1962 | Shackman | 29—470.1 X |
| 3,371,404 | 3/1968 | Lemelson | 29—470.1 X |
| 3,371,414 | 3/1968 | Gwyn | 29—470.1 X |

JOHN F. CAMPBELL, Primary Examiner

D. C. REILEY, Assistant Examiner

U.S. Cl. X.R.

29—470.3, 470.9, 475, 478, 498